United States Patent [19]

Wang et al.

[11] Patent Number: 4,663,400

[45] Date of Patent: May 5, 1987

[54] EPOXY RESINS PREPARED FROM TRISPHENOLS AND DICYCLOPENTADIENE

[75] Inventors: Chun S. Wang; Gary W. Bogan, both of Lake Jackson, Tex.

[73] Assignee: The Dow Chemical Company, Midland, Mich.

[21] Appl. No.: 856,256

[22] Filed: Apr. 28, 1986

[51] Int. Cl.[4] ...................... L08G 59/32; L08G 59/06
[52] U.S. Cl. ...................................... 525/481; 528/97; 528/109; 528/123; 549/560
[58] Field of Search ............... 528/97, 98; 549/560; 525/481

[56] References Cited

U.S. PATENT DOCUMENTS

| | | | |
|---|---|---|---|
| 3,404,102 | 10/1968 | Starcher et al. | 549/560 |
| 3,536,734 | 10/1970 | Vegter et al. | 260/348.6 |
| 3,787,451 | 1/1974 | Mah | 528/98 |
| 3,789,053 | 1/1974 | Clarke | 528/98 |
| 3,876,618 | 4/1975 | Clarke | 528/98 |
| 4,390,680 | 6/1983 | Nelson | 528/97 |
| 4,397,497 | 7/1983 | Nelson et al. | 528/101 |
| 4,481,347 | 11/1984 | Bertram et al. | 528/98 |

FOREIGN PATENT DOCUMENTS 951730 7/1974 Canada .................................. 528/98

OTHER PUBLICATIONS

Article entitled "Electronics-Related Materials Entered the Second Stage/DIPP Epoxy, Originally Developed Material, Reached the Goal", Mar. 23, 1985 issue of *The Kagaku Kogyo Daily*.

*Primary Examiner*—Earl Nielsen
*Assistant Examiner*—Dennis R. Daley
*Attorney, Agent, or Firm*—James G. Carter

[57] ABSTRACT

New epoxy resins result from dehydrohalogenation of the reaction product of an epihalohydrin such as epichlorohydrin with the reaction product of a trisphenol such as 1,1,1-tris(hydroxyphenyl)methane with dicyclopentadiene or an oligomer thereof. These new epoxy resins are useful in the electronics industry as encapsulants, potting compounds, laminates and the like.

20 Claims, No Drawings

EPOXY RESINS PREPARED FROM TRISPHENOLS AND DICYCLOPENTADIENE

BACKGROUND OF THE INVENTION

The present invention pertains to novel multifunctional epoxy resins prepared from the reaction product of trisphenols and dicyclopentadiene and to cured products thereof.

The electronics industry is always seeking to improve electronic components through the use of raw materials having improved properties which are employed in the manufacture of electronic components. One of the requirements of the raw materials for use in encapsulants, potting compositions and laminates employed in the electronics industry is epoxy resins having high heat distortion temperatures and high resistance to moisture absorption. The present invention provides novel epoxy resins which have high heat distortion temperatures and high moisture resistance.

SUMMARY OF THE INVENTION

One aspect of the present invention pertains to a multifunctional epoxy resin represented by the following formula

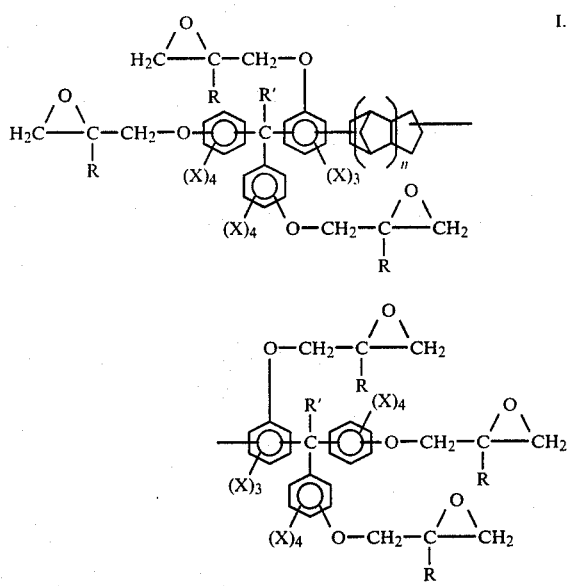

wherein each R is independently hydrogen or an alkyl group having from 1 to about 4 carbon atoms; each R' is independently hydrogen or a hydrocarbyl group having from 1 to about 12, preferably from 1 to about 8, most preferably from 1 to about 5, carbon atoms; each X is independently hydrogen, a monovalent hydrocarbyl group having from 1 to about 6, preferably from 1 to about 3 carbon atoms or a halogen atom, preferably chlorine or bromine and n has an average value of from 1 to about 8, preferably from about 1 to about 5, most preferably from about 1 to about 3.

The term hydrocarbyl as employed herein means any aliphatic, cycloaliphatic, aromatic, aryl substituted aliphatic or aliphatic substituted aromatic groups.

Another aspect of the present invention pertains to compositions comprising (A) at least one of the aforementioned multifunctional epoxy resins and (B) a curing amount of at least one curing agent for said multifunctional epoxy resin.

Still another aspect of the present invention pertains to products resulting from curing the aforementioned curable compositions.

DETAILED DESCRIPTION OF THE INVENTION

The multifunctional epoxy resins of the present invention are prepared by dehydrohalogenating the reaction product of an epichlorohydrin with the reaction product of a trisphenol with dicyclopentadiene or an oligomer of dicyclopentadiene or derivatives of dicyclopentadiene or oligomers of derivatives of dicyclopentadiene.

The reaction of the trisphenol with the dicylopentadiene, its derivatives or oligomers thereof is usually conducted at a temperature of from about 80° C. to about 180° C., preferably from about 100° C. to about 170° C., most preferably from about 120° C. to about 170° C. for a time sufficient to complete the reaction, usually from about 2 to about 10, preferably from about 2 to about 8, most preferably from about 2 to about 6 hours in the presence of a suitable acidic catalyst such as, for example, Lewis acids, alkyl, aryl and aralkyl sulfonic acids and disulfonic acids of diphenyloxide and alkylated diphenyloxide, sulfuric acid, hydrochloric acid, combinations thereof and the like. Particularly suitable catalysts include, for example, BF$_3$ gas, organic complexes of boron trifluoride such as those complexes formed with phenol, cresol, ethanol, acetic acid, ether and the like. Also suitable Lewis acid catalysts include, for example, aluminum chloride, zinc chloride, stannic chloride, titanium chloride and the like. Also suitable as catalysts include, for example, activated clays, silica, silica-alumina complexes and the like.

If desired, the reaction can also be conducted in the presence of solvents such as, for example, aromatic hydrocarbons, halogenated aromatic hydrocarbons and the like. Particularly suitable solvents include, for example, benzene, toluene, xylene, chlorobenzene, dichlorobenzene, combinations thereof and the like.

The dicyclopentadiene or oligomers or derivatives thereof can be employed in essentially pure form or they can be employed in conjunction with or admixture with other unsaturated hydrocarbons such as, for example those disclosed by Donald L. Nelson in U.S. Pat. No. 4,390,680 issued Jan. 28, 1983 which is incorporated herein by reference.

The reaction of an epihalohydrin with the reaction product of a trisphenol and a dicyclopentadiene, its derivative or oligomer thereof can be conducted at temperatures of from about 50° C. to about 120° C., preferably from about 55° C. to about 100° C., most preferably from about 60° C. to about 80° C. for a time sufficient to complete the reaction, usually from about 2 to about 10, preferably from about 2 to about 8, most preferably from about 2 to about 6 hours. The reaction is conducted in the presence of a suitable catalyst such as alkali metal hydroxides, tertiary amines, quaternary ammonium compounds and the like.

Particularly suitable catalysts include, for example, sodium hydroxide, potassium hydroxide, lithium hydroxide, benzyltrimethyl ammonium chloride, benzyltrimethyl ammonium bromide, benzyltriethyl ammonium chloride, benzyltriethyl ammonium bromide, tetramethyl ammonium chloride, tetramethyl ammonium bromide, tetraethyl ammonium chloride, tetraethyl ammonium bromide, tetrabutyl ammonium chloride, tetrabutyl ammonium bromide, tetramethyl ammonium hydrogen sulfate, tetraethyl ammonium hydrogen sulfate, tetrabutyl ammonium hydrogen sulfate, tetramethyl ammonium hydroxide, tetraethyl ammonium hydroxide, tetrabutyl ammonium hydroxide, tetramethyl phosphonium chloride, tetramethyl phospohonium iodide, tetraethyl phosphonium chloride, tetraethyl phosphonium iodide, tetrabutyl phosphonium chloride, tetrabutyl phosphonium iodide, ethyltriphenyl phosphonium chloride, ethyltriphenyl phosphonium iodide, combinations thereof and the like.

The reaction can also be conducted in the presence of solvents such as, for example, alcohols, glycol ethers, ketones, aromatic hydrocarbons cyclic ethers, combinations thereof and the like.

Particularly suitable solvents include, for example, acetone, methyl ethyl ketone, benzene, toluene, xylene, dioxane, cyclohexanol, 1-methoxy-2-hydroxy propane, ethylene glycol diethyl ether, combinations thereof and the like.

The dehydrohalogenation reaction can be conducted by reacting the intermediate halohydrin ether product with a suitable basic acting material such as for example, alkali metal hydroxides, alkali metal bicarbonates, alkali metal carbonates, alkali metal alkoxides, combinations thereof and the like.

Particularly suitable dehydrohalogenation agents include, sodium hydroxide, potassium hydroxide, sodium methoxide, sodium ethoxide, sodium propoxide, sodium butoxide, potassium methoxide, potassium ethoxide, potassium propoxide, potassium butoxide, combinations thereof and the like.

The dehydrohalogenation reaction can be conducted at temperatures of from about 50° C. to about 150° C., preferably from about 50° C. to about 130° C., most preferably from about 50° C. to about 100° C. for a time sufficient to complete the reaction, usually from about 2 to about 12, preferably from about 2 to about 8, most preferably from about 2 to about 6 hours.

Suitable epihalohydrins which can be employed to prepare the multifunctional epoxy resins of the present invention include, for example, epichlorohydrin, epibromohydrin, epiiodohydrin, methylepichlorohydrin, methyl epibromohydrin, methylepiiodohydrin, ethylepichlorohydrin, ethylepibromohydrin, ethylepiiodohydrin, propylepichlorohydrin, propylepibromohydrin, propylepiiodohydrin, butylepichlorohydrin, butylepibromohydrin, butylepiiodohydrin, combinations thereof and the like.

Suitable trisphenols which can be employed herein include those represented by the following formula

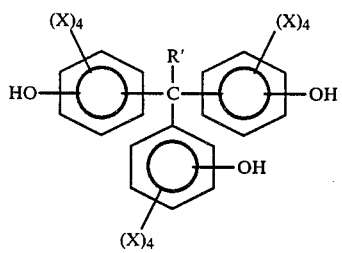

II.

wherein R' and X are as defined above.

Suitable curing agents which can be employed herein include, for example, tertiary amines, dicarboxylic acids, dicarboxylic acid anyhydrides, biguanides, sulfonamides, amides, sulfones, polyhydric phenols, quanadines, novolac resins, combinations thereof and the like.

Particularly suitable curing agents include, bis-(4-aminophenyl)sulfone, aminophenyl sulfonamide, dicyandiamide, phenol-formaldehyde novolac resins, cresol-formaldehyde novolac resins, phenylenediamine, methylene dianiline, phthalic anhydride, combinations thereof and the like.

If desired, the curable compositions can contain in addition to the multifunctional epoxy resins and curing agents therefor, one or more additives including, for example, solvents, flow control agents, wetting agents, pigments, dyes, fillers, leveling agents, flame retardant agents, reinforcing materials, plasticizers, extenders, mold releasing agents, combinations thereof and the like.

The following examples are illustrative of the present invention but are not to be construed as to limiting their scope in any manner.

EXAMPLE 1

A. Preparation of Reaction Product of Trisphenol with Dicyclopentadiene

Into a 2-liter flask equipped with a means for stirring, distillation means and temperature indicating and control means was added 1168 g (4 moles, 12 hydroxyl equiv.) of 1,1,1-(hydroxyphenyl)methane and the contents heated to 140° C. and a slight vacuum was applied so as to distill off moisture in the 1,1,1-(hydroxyphenyl)methane. When no more moisture vapor was produced, the contents were cooled to 120° C. and 7.2 g of boron trifluoride etherate was added drop-wise through a dropping funnel followed by the drop-wise addition through the dropping funnel of 87.5 g (0.65 mole) of dicyclopentadiene while maintaining the reaction temperature at $\approx 125°$ C. Upon completion of the dicyclopentadiene addition which took 2 hours (7200 s), the temperature of the reaction mixture was slowly increased to 170° C. and maintained thereat for 2 hours (7200 s). The reaction mixture was then poured onto an aluminum sheet and allowed to solidify. A dark, amber colored solid with a Mettler softening point of 115° C. was obtained in an amount of 1229 grams.

B. Epoxidation of Reaction Product from A Above

To a 5-liter reaction vessel equipped with a temperature and pressure control and indicating means, means for continuous addition of aqueous sodium hydroxide, a means for condensing and separating water from a codistillate mixture of water, solvent and epichlorohydrin and means for returning the solvent and epichlorohydrin to the reaction vessel was added 600 g (6 equiv.) of the product produced in A above, 3053 g (33 equiv.) of epichlorohydrin and 538 g of the methyl ether of propylene glycol (1-methoxy-2-hydroxy propane) as a solvent. After stirring at room temperature ($\approx 25°$ C.) and atmospheric pressure to thoroughly mix the contents, the temperature was raised to 65° C. and the pressure was reduced to 180 mm Hg absolute. To the resultant solution was continuously added 532.8 g (6.66 equiv.) of 50% aqueous sodium hydroxide solution at a constant rate over a period of 4 hours (144,400 s). During the addition of the sodium hydroxide, the water was removed by codistillation with epichlorohydrin and solvent. The distillate was condensed thereby forming two distinct phases, an aqueous phase (top) and an organic epichlorohydrin-solvent phase (bottom). The organic phase was continuously returned to the reactor. After completion of the sodium hydroxide addition, the reaction mixture was maintained at a temperature of 65° C. and a pressure of 180 mm Hg absolute for an additional 30 minutes (1800 s). The resulting epoxy resin was then distilled under full vacuum and a temperature up to 170° C. to remove all epichlorohydrin and 1-methoxy-2-hydroxy propane. To the molten epoxy resin was added an equal weight of a 75/25 by weight mixture of methyl ethyl ketone (MEK)/toluene. A sample of the slurry was taken and was found to contain 815 ppm hydrolyzable chloride. The mixture was heated to 80° C. and 2.73 g of 45% aqueous potassium hydroxide (0.45 equiv. KOH to 1 equiv. chlorine) was added all at once and the reaction mixture was maintained at 80° C. for 2 hours (7200 s) with good agitation. The reaction mixture was diluted to 20% resin concentration with MEK/Toluene (75/25 by weight) solvent mixture, neutralized with $CO_2$ and then washed with water 4–5 times to remove the salt. The organic phase from the water washes was placed in a rotating evaporator under a full vacuum and a temperature of 170° C. to remove the solvent completely. An epoxy resin (902 grams) having a Mettler softening point of 84.1° C., a hydrolyzable chloride content of 41 ppm and an epoxide equivalent weight (EEW) of 202 was obtained.

C. Curing of Epoxy Resin Prepared in B Above

To 483 g (3 epoxy equiv.) of the multifunctional epoxy resin prepared in B above was added 148 g (2.55 equiv., 85% of stoichiometric) of diaminodiphenyl sulfone as a curing agent. The mixture was cured at 150° C. for 1 hour (3600 s) and post cured at 200° C. for 2 hours (7200 s), at 225° C. for 2 hours (7200 s) and at 250° C. for 1 hour (3600 s). The resultant cured product had a glass transition temperature of >300° C. and absorbed 2.5% by weight of moisture after being subjected to boiling water for 14 days (1,036,800 s). For comparative purposes, a triglycidyl ether of 1,1,1-tri(hydroxyphenyl)methane cured in a similar manner had a glass transition temperature of 295° C. and picked up 5% by weight moisture after being subjected to boiling water for 14 days (1,036,800 s).

We claim:

1. A multifunctional epoxy resin represented by the formula

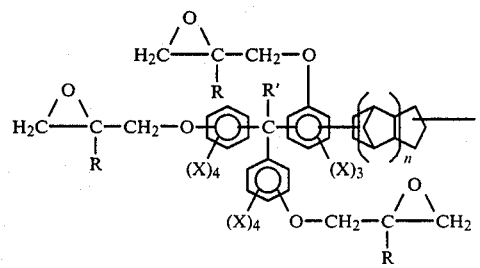

-continued

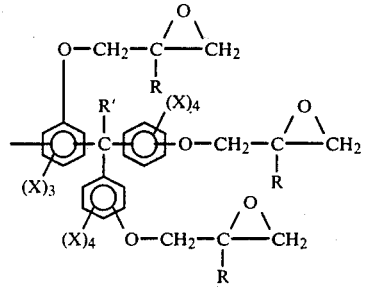

wherein each R is independently hydrogen or an alkyl group having from 1 to about 4 carbon atoms; each R' is independently hydrogen or a hydrocarbyl group having from about 1 to about 4 carbon atoms; each X is independently hydrogen or a hydrocarbyl group having from 1 to about 3 carbon atoms or a halogen and n has an average value of from 1 to about 8.

2. A multifunctional epoxy resin of claim 1 wherein n has an average value of from about 1 to about 5.

3. A multifunctional epoxy resin of claim 2 wherein n has an average value of from about 1 to about 3.

4. A multifunctional epoxy resin of claim 3 wherein each R and R' is hydrogen.

5. A composition comprising (A) at least one multifunctional epoxy resin of claim 1 and (B) a curing amount of at least one curing agent for said multifunctional epoxy resin.

6. A composition of claim 5 wherein said curing agent is diaminodiphenyl sulfone, phenol-formaldehyde novolac resin, aminophenyl sulfonamide, dicyandiamide or combination thereof.

7. A composition comprising (A) at least one multifunctional epoxy resin of claim 2 and (B) a curing amount of at least one curing agent for said multifunctional epoxy resin.

8. A composition of claim 7 wherein said curing agent is diaminodiphenyl sulfone, phenol-formaldehyde novolac resin, aminophenyl sulfonamide, dicyandiamide or combination thereof.

9. A composition comprising (A) at least one multifunctional epoxy resin of claim 3 and (B) a curing amount of at least one curing agent for said multifunctional epoxy resin.

10. A composition of claim 8 wherein said curing agent is diaminodiphenyl sulfone, phenol-formaldehyde novolac resin, aminophenyl sulfonamide, dicyandiamide or combination thereof.

11. A composition comprising (A) at least one multifunctional epoxy resin of claim 4 and (B) a curing amount of at least one curing agent for said multifunctional epoxy resin.

12. A composition of claim 11 wherein said curing agent is diaminodiphenyl sulfone, phenol-formaldehyde novolac resin, aminophenyl sulfonamide, dicyandiamide or combination thereof.

13. The product resulting from curing the curable composition of claim 5.

14. The product resulting from curing the curable composition of claim 6.

15. The product resulting from curing the curable composition of claim 7.

16. The product resulting from curing the curable composition of claim 8.

17. The product resulting from curing the curable composition of claim 9.

18. The product resulting from curing the curable composition of claim 10.

19. The product resulting from curing the curable composition of claim 11.

20. The product resulting from curing the curable composition of claim 12.

* * * * *